(No Model.) 4 Sheets—Sheet 1.
M. JENSEN.
METHOD OF SOLDERING CAN BODIES.
No. 435,840. Patented Sept. 2, 1890.
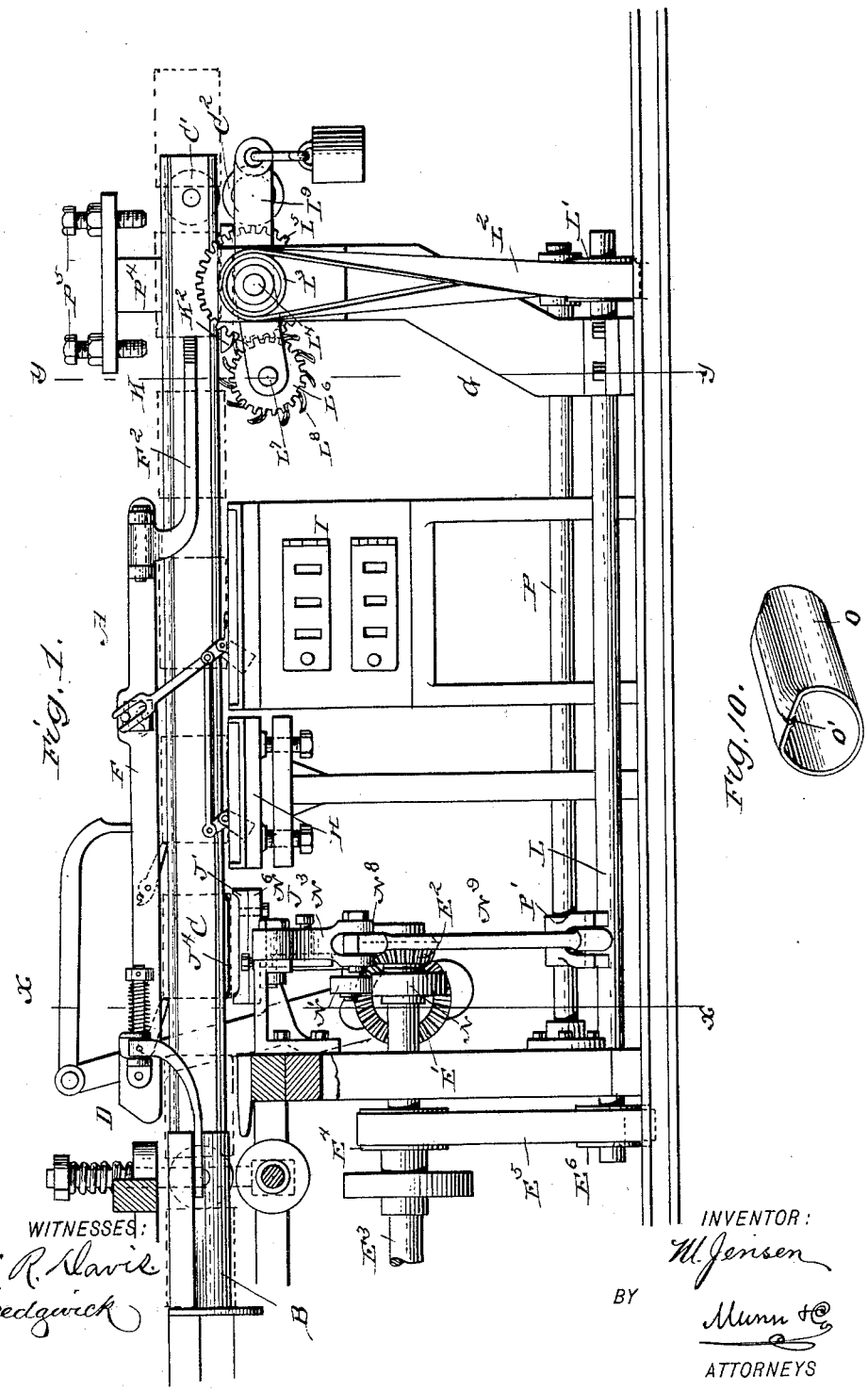
WITNESSES:
W. R. Davis
C. Sedgwick
INVENTOR:
M. Jensen
BY
Munn & Co.
ATTORNEYS (No Model.) 4 Sheets—Sheet 2.
M. JENSEN.
METHOD OF SOLDERING CAN BODIES.
No. 435,840. Patented Sept. 2, 1890.
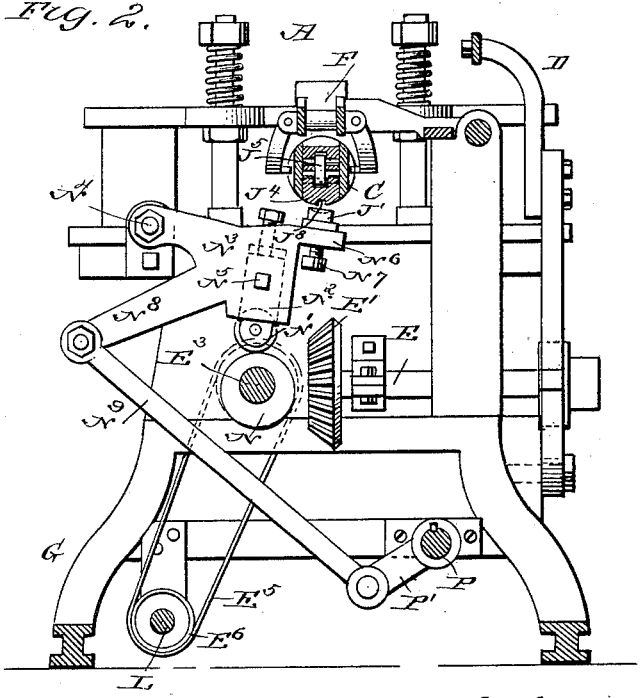
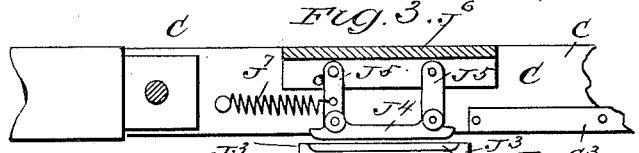
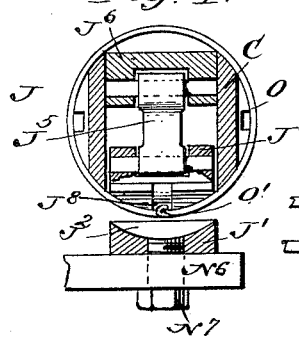
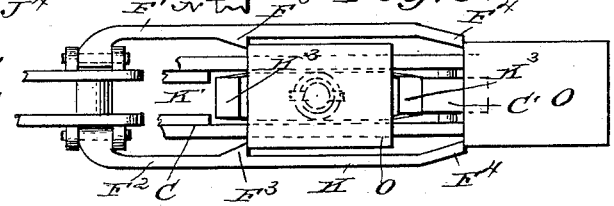
WITNESSES:
W. R. Davis.
C. Sedgwick.
INVENTOR:
M. Jensen
BY
Munn & Co.
ATTORNEYS (No Model.) 4 Sheets—Sheet 3.
M. JENSEN.
METHOD OF SOLDERING CAN BODIES.
No. 435,840. Patented Sept. 2, 1890.
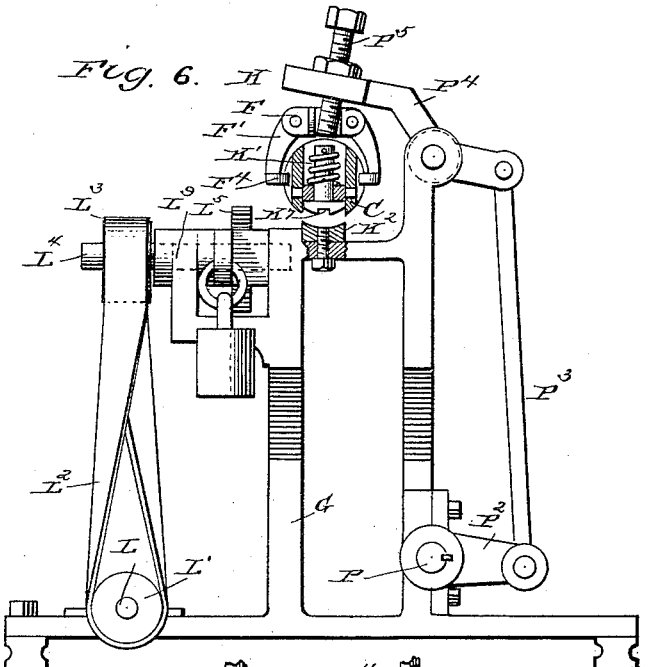
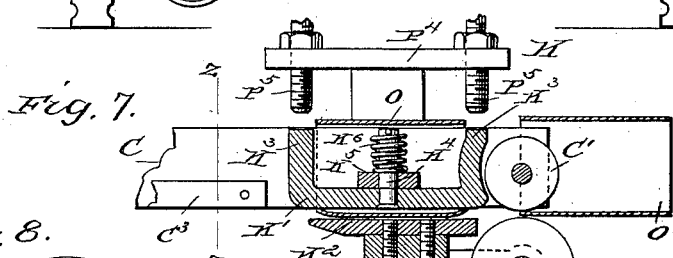
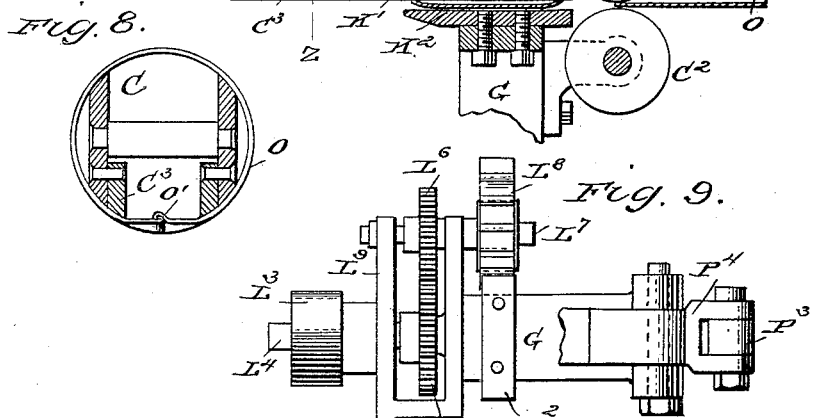
WITNESSES:
W. R. Davis
C. Sedgwick
INVENTOR:
M. Jensen
BY
Munn & Co.
ATTORNEYS
THE NORRIS PETERS CO., PHOTO-LITHO., WASHINGTON, D. C.

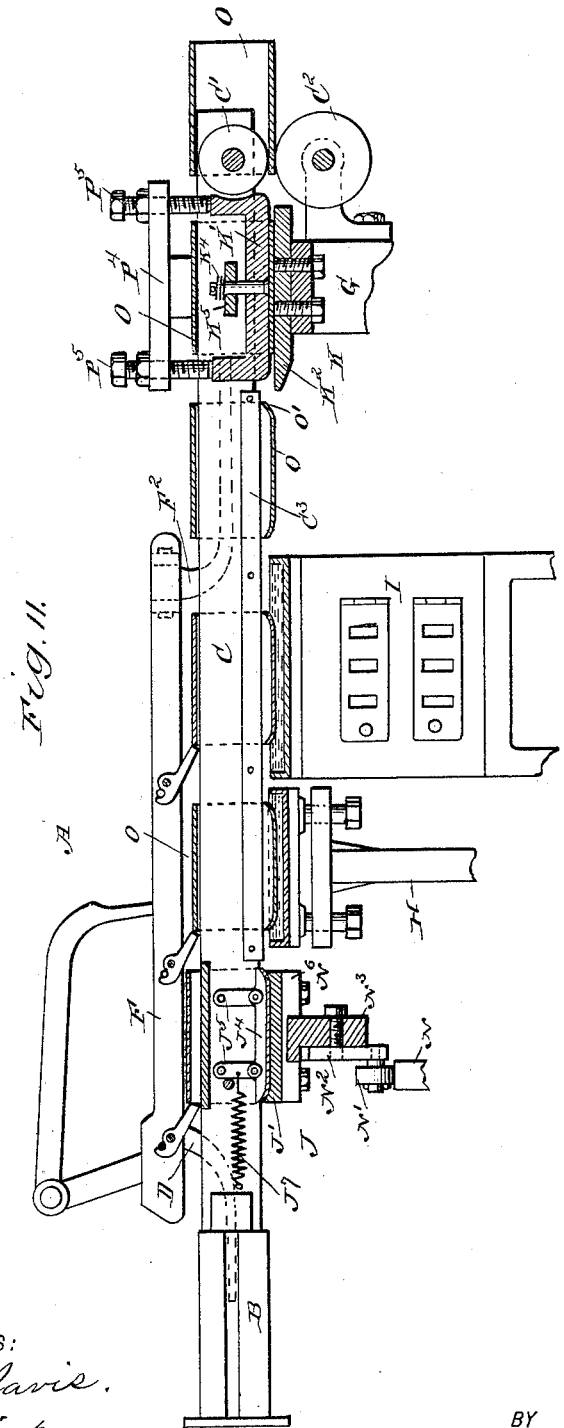

UNITED STATES PATENT OFFICE.

MATHIAS JENSEN, OF ASTORIA, OREGON, ASSIGNOR OF ONE-HALF TO THE JENSEN CAN FILLING MACHINE COMPANY, OF SAME PLACE.

METHOD OF SOLDERING CAN-BODIES.

SPECIFICATION forming part of Letters Patent No. 435,840, dated September 2, 1890.

Application filed April 3, 1890. Serial No. 346,407. (No model.)

*To all whom it may concern:*

Be it known that I, MATHIAS JENSEN, of Astoria, in the county of Clatsop and State of Oregon, have invented a new and Improved Method for Soldering Sheet-Metal Can-Bodies, of which the following is a full clear, and exact description.

The invention relates to machines for forming sheet-metal can-bodies, such as shown and described in the application for Letters Patent, Serial No. 331,011, filed by me November 20, 1889.

The object of the invention is to provide a new and improved method for soldering sheet-metal can-bodies and by which the solder is prevented from entering the insides of the bodies during the process of soldering, so as to prevent spoiling or poisoning the goods packed in the finished cans and save solder.

The method consists of first bending the ends of the seam of the can-body inward, then passing the seam through the flux and solder baths with the bent ends above the level of the baths, and then straightening the bent ends of the seam.

The method is preferably carried out by the machine illustrated in the accompanying drawings, and for which I have made a separate application, it being a division of the present application, and filed June 25, 1890, Serial No. 356,677.

Reference is to be had to the accompanying drawings, forming a part of this specification, in which similar letters of reference indicate corresponding parts in all the figures Figure 1 is a side elevation of the improvement with parts in section. Fig. 2 is a transverse section of the same on the line $x\ x$ of Fig. 1. Fig. 3 is an enlarged sectional side elevation of the bending device. Fig. 4 is an enlarged transverse section of the same with a can-body in position thereon. Fig. 5 is a plan view of the same. Fig. 6 is a transverse section of the improvement on the line $y\ y$ of Fig. 1. Fig. 7 is an enlarged sectional side elevation of the can-body straightening device. Fig. 8 is an enlarged transverse section of the same on the line $z\ z$ of Fig. 7. Fig. 9 is a plan view of the seam and adjacent parts. Fig. 10 is a perspective view of the can-body after bending it; and Fig. 11 is a transverse section of the carrying-frame, the bending device, fluxing and soldering baths, and the straightening device.

The soldering-machine A, presently to be described, is preferably used in place of the soldering device in the machine for forming sheet-metal can-bodies shown and described in application for Letters Patent No. 331,011, above referred to.

The sheet-metal blank is preferably formed into a cylindrical body with interlocked lips by the several devices shown and described in the said application, and then the body so formed passes from the horn B onto the carrying-frame C of the soldering-machine A by a reciprocating mechanism D, operated from the main driving-shaft E, as more fully described in the application above referred to. A second device F, also described in the above-mentioned application, and operated from the transverse main driving-shaft E, serves to impart an intermittent motion to the several can-bodies on the carrying-frame C. The front end of the carrying-frame C is pivotally connected with the end of the horn B, and the rear end of the said carrying-frame carries the roller C', adapted to rest on a roller $C^2$, mounted to turn in suitable bearings on the outer end of the bracket of the main frame G, on which the soldering-machine is mounted, the said main frame being part of the main frame for the machine for forming sheet-metal can-bodies described in the application above referred to.

The soldering-machine A is provided with a fluxing device H, arranged on the under side of the carrying-frame C and located alongside the soldering device I, both devices H and I being of the same construction as those described in the application No. 331,011, above referred to, so that a further detailed description of the same is not deemed necessary.

Between the fluxing device H and the end of the horn B is arranged a bending device J for bending the ends of the seam of the can-body inward, as illustrated in Fig. 10, preparatory to the passing of the said can-body into the fluxing device H and the soldering device I. In the rear of the latter is arranged a straightening device K, which serves to straighten out the bent ends of the seam after the can-body has left the soldering device I. The said bending device J and the straightening device K are constructed as follows:

Both devices are operated simultaneously from the main driving-shaft E, which for this purpose is provided with a bevel gear-wheel E', meshing into a bevel gear-wheel $E^2$, secured on the longitudinally-extending shaft $E^3$, mounted to turn in suitable bearings on the main frame G. A pulley $E^4$ is secured on the shaft $E^3$, and over it passes a belt $E^5$, also passing over a pulley $E^6$, secured on the longitudinally-extending shaft L, mounted to turn in suitable bearings in the lower part of the main frame G, and carrying on its outer end a pulley L', over which passes the quarter-twist belt $L^2$, also passing over a pulley $L^3$, secured on a shaft $L^4$, extending transversely and mounted to turn in suitable bearings on the outer bracket of the main frame G in line with the straightening device K. (See Fig. 9.)

On the shaft $L^4$ is secured a gear-wheel $L^5$, which meshes into a gear-wheel $L^6$, secured on a shaft $L^7$, carrying the wiper $L^8$, which serves to wipe the seam of the can-body before it passes to the straightening device K. The shaft $L^7$ is mounted to turn in a frame $L^9$, fulcrumed on the shaft $L^4$ and counterbalanced by a weight, so as to press the wiper $L^8$ in contact with the under side of the seam of the can-body.

On the shaft $E^3$, previously mentioned, is arranged a cam-wheel N, on the periphery of which travels a friction-wheel N', mounted to turn in a plate $N^2$, held vertically adjustable on a lever $N^3$, fulcrumed at $N^4$ to the main frame G, the said plate being secured in place when adjusted by a set-screw $N^5$. (See Figs. 2 and 3.)

On the lever $N^3$ is formed a longitudinally-extending arm $N^6$, on the top of which is secured the male die J' of the bending device J, the said die being secured in place on the arm $N^6$ by suitable set-screws $N^7$, as is plainly shown in Figs. 3 and 4. The male die J' is provided on its top with a concave recess $J^2$, the ends of which are curved upward at $J^3$, as is plainly illustrated in Fig. 3. Over this concave recess is adapted to operate the female die $J^4$, similar in shape to the recess $J^2$ and supported on the links $J^5$, extending vertically and pivoted on a cross-plate $J^6$, secured between the sides of the carrying-frame C. A spring $J^7$ is secured by one end to the carrying frame C and by its other end to one of the links $J^5$, so as to hold the latter, and consequently the female die $J^4$, in a normal position, at the same time permitting the said links $J^5$ to swing longitudinally in order to raise the female die $J^4$ when the can-body is moved forward from the bending mechanism J.

On the under side of the female die $J^4$ is arranged a longitudinal groove $J^8$, into which is adapted to pass the seam O' of the can-body O under treatment when in the bending mechanism J. The female die $J^4$, as well as the recess $J^2$ in the male die J', is of the same length as the can-body, so that when the latter is between the said dies and the lever $N^3$ is swung upward the said male die J' presses against the under side of the can-body, and the latter against the female die $J^4$, so that the ends of the can-body are bent inward by the curved ends $J^3$ of the said recess and female die. The can-body O then assumes the shape shown in Fig. 10. It is understood that the seams O' of the can-bodies passing along the carrying-frame are always on the under side. When the shaft $E^3$ is rotated from the main driving-shaft E, the cam N, acting on the friction-wheel N', causes the lever $N^3$ to swing upward, so as to impart the necessary upward motion for bending the can-body to the said male die J'. When the highest point of the cam N has passed the friction-wheel N', the lever $N^3$ swings downward by its own weight until the friction-wheel N' stands at the lowermost point of the said cam, as is plainly shown in Fig. 2. Now, in order to operate the straightening mechanism K simultaneously with the bending mechanism J, the said lever $N^3$ is provided with an arm $N^8$, pivotally connected by a link $N^9$ with an arm P', secured on a longitudinally-extending shaft P, mounted to turn in suitable bearings in the lower parts of the main frame G. On the outer end of the said shaft P is secured an arm $P^2$, pivotally connected by a link $P^3$ with a lever $P^4$, fulcrumed on the top and on the outer bracket of the main frame G in line with the shaft $L^4$, previously described. The lever $P^4$ extends inward and over the carrying-frame C, and is provided at its inner end with adjustable bolts $P^5$, adapted to operate the male die K' of the straightening device K, the said die being located between the sides of the carrying-frame C and over the female die $K^2$, secured on the outer bracket of the main frame G. The male die K' is made U-shaped, with its ends $K^3$ extending upward between the sides of the carrying-frame C, the upper ends being adapted to be engaged by the bolts $P^5$, held on the lever $P^4$. The distance between the ends $K^3$ of the male die K' is equal to the length of the can-body under treatment, so that when the can-body is in place on the male die, as plainly illustrated in Fig. 7, and the lever $P^4$ descends, then the lower ends of the bolts $P^5$ can press onto the ends of the said male die without striking the can-body resting between the ends of the die. The male die K' is held on a bolt $K^4$, secured to its bottom and extending upward through a transverse plate $K^5$, secured to the sides of the carrying-frame C. A spring $K^6$ is coiled on the upper end of the bolt $K^4$, and is secured by one end to the said bolt and rests at its other end on the top of the plate $K^5$, so that when the die is pressed downward by the bolts P⁵ the spring K⁶ is compressed and draws the die upward to its normal position, when the lever P⁴ swings upward. The female die K² is concave on its surface, and the under side of the male die is correspondingly shaped and is also provided with a longitudinally-extending groove K⁷ for the reception of the inside of the seam. The can-body O is moved into the proper position on the male die K′ from the reciprocating device F, which is provided at its rear end with longitudinally-extending arms F′ and F², passing to the sides of the carrying-frame C, and provided with lugs F³, which engage the inner edges of the can-bodies, so that when the device F is reciprocated and is on its outward stroke the extreme outer ends of the said arms engage the can-body on the die K′ and shove the can-body off of the latter and over and between the rollers C′ and C², from which they drop into a suitable receptacle. At the same time the lugs F³ move a new can-body onto the die K′ to the position shown in Fig. 7.

In order to prevent the can-bodies from turning between the bending device J and the straightening device K, the insides of the sides of the carrying-frame C are provided with longitudinally-extending strips C³, adapted to pass at their inner edges onto the straight part of the bent ends of the can-body, as is plainly shown in Fig. 8, whereby a turning of the can-body is prevented.

The operation is as follows: When the main driving-shaft E is set in motion, the several can-bodies receive an intermittent forward motion on the carrying-frame C by the reciprocating device F. The can-body after leaving the horn B is passed between the dies J′ and J⁴ of the bending device J, and as soon as the reciprocating device F is on its return-stroke and the several can-bodies on the carrying-frame C are at rest, then the cam N swings the lever N³ upward, so that the male die J′ bends the ends of the can O into the shape shown in Fig. 10. As soon as this has been accomplished the lever N³ swings downward, and then the reciprocating device F moves the bent can-body forward onto the fluxing device H, in which the acid is passed into the seam or only on the outside, as the bent upper ends O′ of the said can-body O prevent the acid from passing to the inside. After this is accomplished at the next forward stroke of the reciprocating device F the bent and fluxed can-body O is passed onto the soldering device I, in which the solder is passed onto the outside of the seam only, as the bent upper ends O′ of the said can-body prevent the solder from passing to the inside of the can as long as the latter is held with its under side on top of the solder bath. At the next forward stroke of the reciprocating device F the soldered can-body passes to an intermediate position between the soldering device I and the straightening device K, and at the next following forward stroke of the said reciprocating device the can-body passes over the wiper L and onto the male die K′ of the straightening device K. During the time the reciprocating device F makes its return-stroke the lever P⁴ swings downward, so that the male die K′ is pressed downward, and by its under side straightens out the bent end of the can-body as the said can-body is pressed onto the stationary female die K². As soon as the lever P⁴ swings upward the spring K⁶ raises the male die K′ to its former position, and the next following forward stroke of the reciprocating device F moves the straightened and soldered can-body off of the machine.

It is understood that as the male die J′ of the bending device J is moved upward and presses against the under side of the can-body the lever P⁴ swings downward at the same time, so that an equal pressure is exerted on the top and bottom of the carrying-frame C to prevent the latter from being raised, which would be the case if the lever P⁴ did not swing downward at the same time that the lever N³ swings upward.

Having thus fully described my invention, I claim as new, and desire to secure by Letters Patent—

1. The herein-described method for soldering sheet-metal can-bodies, consisting of first bending the ends of the seam of the can-body inward and then passing the seam through the fluxing and soldering bath, with the bent ends above the level of the bath, substantially as shown and described.

2. The herein-described method for soldering sheet-metal can-bodies, consisting of first bending the ends of the seam of the can-body inward and then passing the seam through the fluxing and soldering bath, with the bent ends above the level of the bath, and then straightening the bent ends of the seam, substantially as shown and described.

MATHIAS JENSEN.

Witnesses:
C. W. FULTON,
G. C. FULTON.